United States Patent
Miyasaka

(10) Patent No.: US 12,420,342 B1
(45) Date of Patent: Sep. 23, 2025

(54) CEMENTED CARBIDE AND CUTTING TOOL

(71) Applicant: Sumitomo Electric Hardmetal Corp., Itami (JP)

(72) Inventor: Nobuo Miyasaka, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 19/118,357

(22) PCT Filed: Jun. 27, 2024

(86) PCT No.: PCT/JP2024/023342
§ 371 (c)(1),
(2) Date: Apr. 4, 2025

(51) Int. Cl.
*B23B 51/00* (2006.01)

(52) U.S. Cl.
CPC ...... *B23B 51/0007* (2022.01); *B23B 2222/28* (2013.01)

(58) Field of Classification Search
CPC .................. B23B 51/0007; B23B 2222/28
See application file for complete search history.

(56) References Cited

U.S. PATENT DOCUMENTS

| | | | |
|---|---|---|---|
| 2020/0392606 A1 | 12/2020 | Fudo et al. | |
| 2022/0016715 A1* | 1/2022 | Yamanishi | B23C 5/16 |
| 2024/0318285 A1 | 9/2024 | Ishida et al. | |

FOREIGN PATENT DOCUMENTS

| | | |
|---|---|---|
| JP | 2007-092090 A | 4/2007 |
| JP | 2008-132570 A | 6/2008 |
| JP | 2012-052237 A | 3/2012 |
| JP | 2012-117100 A | 6/2012 |
| WO | 2019/098183 A1 | 5/2019 |
| WO | 2023/188012 A1 | 10/2023 |

OTHER PUBLICATIONS

Written Opinion mailed on Sep. 24, 2024, received for PCT Application PCT/JP2024/023342, filed on Jun. 27, 2024, 6 pages including English Translation.

* cited by examiner

*Primary Examiner* — Ricardo D Morales
(74) *Attorney, Agent, or Firm* — XSENSUS LLP

(57) ABSTRACT

A cemented carbide consisting of: a hard phase consisting of tungsten carbide grains; and a binder phase comprising cobalt, wherein a content of the hard phase in the cemented carbide is 91.5 to 97 mass %, a content of the cobalt in the cemented carbide is 3 to 8.5 mass %, the hard phase has an average grain size of 0.15 to 0.50 μm, the binder phase has an average grain size of 0.10 to 0.25 μm, in a histogram showing a grain size distribution of the hard phase, a number N1 is 7 to 10, wherein N1 is the number of classes having a frequency of 50% or more of the maximum frequency Fmax, the classes are 0.05 μm intervals, and the binder phase has a ratio of a 10% cumulative grain size D10 to a 90% cumulative grain size D90 on area basis, D10/D90, of 0.23 or more.

8 Claims, 1 Drawing Sheet

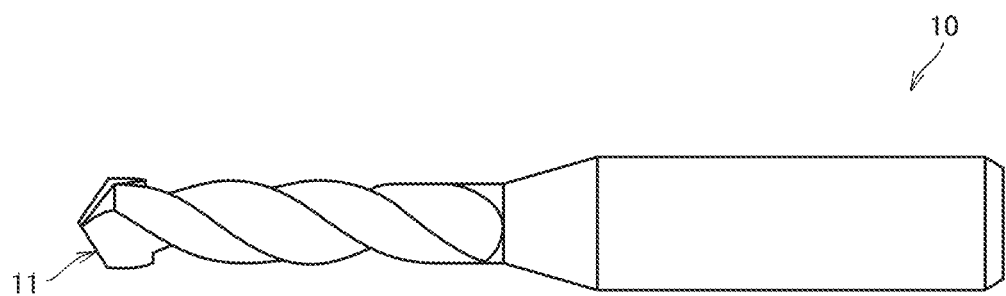

CEMENTED CARBIDE AND CUTTING TOOL

CROSS-REFERENCE TO RELATED APPLICATION

This application is a national stage application, pursuant to 35 U.S.C. § 371, of International Patent Application No. PCT/JP2024/023342, filed Jun. 27, 2024, the entire contents of which are incorporated herein by reference.

TECHNICAL FIELD

The present disclosure relates to a cemented carbide and a cutting tool.

BACKGROUND ART

Drilling a printed circuit board is mainly for creating a hole with a small diameter of ϕ1 mm or less. Accordingly, a so-called fine-grain cemented carbide, which has a hard phase consisting of tungsten carbide grains having an average grain size of 1 μm or less, is used as the cemented carbide used for a tool such as a small-diameter drill (for example, PTL 1 to PTL 3).

CITATION LIST

Patent Literature

PTL 1: Japanese Patent Laying-Open No. 2007-92090
PTL 2: Japanese Patent Laying-Open No. 2012-52237
PTL 3: Japanese Patent Laying-Open No. 2012-117100

SUMMARY OF INVENTION

The cemented carbide of the present disclosure is a cemented carbide consisting of: a hard phase consisting of a plurality of tungsten carbide grains; and a binder phase comprising cobalt, wherein
- a content of the hard phase in the cemented carbide is 91.5 mass % or more and 97 mass % or less,
- a content of the cobalt in the cemented carbide is 3 mass % or more and 8.5 mass % or less,
- the hard phase has an average grain size of 0.15 μm or more and 0.50 μm or less,
- the binder phase has an average grain size of 0.10 μm or more and 0.25 μm or less,
- in a histogram showing a grain size distribution of the hard phase, a number N1 is 7 or more and 10 or less, wherein N1 is the number of classes having a frequency of 50% or more of the maximum frequency Fmax,
- the classes on the horizontal axis of the histogram represent the grain sizes of the hard phase, and the classes are 0.05 μm intervals,
- the frequencies on the vertical axis of the histogram represent percentages, on number basis, of the hard phases falling within the respective classes, the percentages based on all of the hard phases, and
- the binder phase has a ratio of a 10% cumulative grain size D10 on area basis to a 90% cumulative grain size D90 on area basis, D10/D90, of 0.23 or more.

BRIEF DESCRIPTION OF DRAWINGS

FIG. 1 is a FIGURE showing an example of a cutting tool (small-diameter drill) of embodiment 2.

DETAILED DESCRIPTION

Problem to be Solved by the Present Disclosure

With the expansion of 5G (fifth generation mobile communication system), the capacity of information has been increased in recent years. Accordingly, printed circuit boards are required to have further heat resistance. To improve the heat resistance of printed circuit boards, techniques for improving the heat resistance of resins and glass fillers for printed circuit boards have been developed. Due to this, on the other hand, printed circuit boards have become difficult to cut. The difficulty in cutting printed circuit boards results in that a drill including a cemented carbide as a material for the tool tends to have a reduced tool life.

Therefore, an object of the present disclosure is to provide a cemented carbide that achieves a prolonged life of a tool, particularly in fine processing of printed circuit boards, when used as a material for the tool, and also a cutting tool including it.

Advantageous Effect of the Present Disclosure

The cemented carbide of the present disclosure can provide a cutting tool having a prolonged tool life, particularly in fine processing of printed circuit boards.

DESCRIPTION OF EMBODIMENTS OF THE PRESENT DISCLOSURE

First, embodiments of the present disclosure will be listed and described.

(1) The cemented carbide of the present disclosure is a cemented carbide consisting of: a hard phase consisting of a plurality of tungsten carbide grains; and a binder phase comprising cobalt, wherein
- a content of the hard phase in the cemented carbide is 91.5 mass % or more and 97 mass % or less,
- a content of the cobalt in the cemented carbide is 3 mass % or more and 8.5 mass % or less,
- the hard phase has an average grain size of 0.15 μm or more and 0.50 μm or less,
- the binder phase has an average grain size of 0.10 μm or more and 0.25 μm or less,
- in a histogram showing a grain size distribution of the hard phase, a number N1 is 7 or more and 10 or less, wherein N1 is the number of classes having a frequency of 50% or more of the maximum frequency Fmax,
- the classes on the horizontal axis of the histogram represent the grain sizes of the hard phase, and the classes are 0.05 μm intervals,
- the frequencies on the vertical axis of the histogram represent percentages, on number basis, of the hard phases falling within the respective classes, the percentages based on all of the hard phases, and
- the binder phase has a ratio of a 10% cumulative grain size D10 on area basis to a 90% cumulative grain size D90 on area basis, D10/D90, of 0.23 or more.

The cemented carbide of the present disclosure can provide a cutting tool having a prolonged tool life, particularly in fine processing of printed circuit boards. The reason for this is not clear, but the following is inferred.

The cemented carbide of the present disclosure consists of a hard phase consisting of a plurality of tungsten carbide grains and a binder phase comprising cobalt. The content of the hard phase in the cemented carbide is 91.5 mass % or more and 97 mass % or less. The content of the cobalt in the cemented carbide is 3 mass % or more and 8.5 mass % or less. Due to these, the cemented carbide tends to have hardness and abrasion resistance suitable for fine processing of printed circuit boards.

In the cemented carbide of the present disclosure, the hard phase has an average grain size of 0.15 μm or more and 0.50 μm or less. When the hard phase has an average grain size of 0.15 μm or more, the cemented carbide tends to have toughness suitable for fine processing of printed circuit boards. When the hard phase has an average grain size of 0.50 μm or less, the cemented carbide tends to have hardness suitable for fine processing of printed circuit boards.

In the cemented carbide of the present disclosure, the binder phase has an average grain size of 0.10 μm or more and 0.25 μm or less. Due to this, the cemented carbide tends to have a uniform texture to improve chipping resistance.

In the histogram showing the grain size distribution of the hard phase of the cemented carbide of the present disclosure, the number N1 is 7 or more and 10 or less, wherein N1 is the number of classes having a frequency of 50% or more of the maximum frequency Fmax. Due to this, the uniformity of the distribution of contacts between the hard phases is enhanced so that falling off of the hard phase grains is suppressed to thereby improve chipping resistance. In addition, the feature of the binder phase, the ratio D10/D90 of 0.23 or more, which will be described below, can be achieved.

In the cemented carbide of the present disclosure, the binder phase has a ratio of the 10% cumulative grain size D10 on area basis to the 90% cumulative grain size D90 on area basis, D10/D90, of 0.23 or more. Generally, when the binder phase has an average grain size of 0.10 μm or more and 0.25 μm or less, the binder phase is difficult to be dispersed uniformly. Since the D10/D90 is 0.23 or more in the cemented carbide of the present disclosure, the binder phase is uniformly dispersed without localized aggregation thereof, and the cemented carbide can thus have stable chipping resistance.

(2) In (1), the D10/D90 may be 0.25 or more. Due to this, the binder phase can be dispersed further uniformly, and the cemented carbide can thus have further stable chipping resistance.

(3) In (1) or (2), the number of the classes, N1, may be 8 or more and 10 or less. Due to this, the distribution of contacts between the hard phases and the dispersion of the binder phase are more uniform, and the cemented carbide can thus have further stable chipping resistance.

(4) In any of (1) to (3), the cemented carbide may contain 0.3 mass % or more and 1.0 mass % or less of chromium. Chromium has a grain growth inhibitory effect on tungsten carbide grains. A chromium content of the cemented carbide of 0.3 mass % or more and 1.0 mass % or less can effectively prevent fine tungsten carbide grains as a feedstock from remaining as is in the resulting cemented carbide and also can effectively prevent generation of coarse grains, whereby the tool life is improved.

(5) In any of (1) to (4), the cemented carbide may contain 0.3 mass % or less of vanadium. Vanadium has a grain growth inhibitory effect. A vanadium content of the cemented carbide of 0.3 mass % or less can effectively prevent fine tungsten carbide grains as a feedstock from remaining as is in the resulting cemented carbide and also can effectively prevent generation of coarse grains, whereby the tool life is improved.

(6) In any of (1) to (5), the content of the cobalt in the binder phase may be 85 mass % or more and 99.9 mass % or less. Due to this, the cemented carbide has improved toughness.

(7) In any of (1) to (6), in a cross section of the cemented carbide, the number of the hard phases having a grain size of 5 μm or more per unit area may be 1 per $mm^2$ or less. Due to this, the cemented carbide has further improved fracture resistance.

(8) The cutting tool of the present disclosure is a cutting tool comprising the cemented carbide according to any of (1) to (7). The cutting tool of the present disclosure can have a prolonged tool life, particularly in fine processing of printed circuit boards.

DETAILS OF EMBODIMENTS OF PRESENT DISCLOSURE

Specific examples of the cemented carbide and the cutting tool of the present disclosure will now be described with reference to a drawing. In the drawing of the present disclosure, the same reference sign indicates the same part or corresponding part. Dimensional relationships, including a length, width, thickness, and depth, are appropriately changed for the sake of clarification and simplification of the drawing, and do not always show the actual dimensional relationships.

In the present disclosure, the notation form "A to B" means A or more and B or less. There may be a case where A is mentioned without a unit while B is mentioned with a unit. In such a case, the unit for A is the same as the unit for B.

In the present disclosure, there may be a case where a compound or the like is represented by a chemical formula. In such a case, if the atomic ratio therefor is not particularly limited, the chemical formula encompasses those having any atomic ratio conventionally known, and should not be necessarily limited to those having an atomic ratio within its stoichiometric range.

In the present disclosure, when one or more numerical values are disclosed for each of the lower limit and upper limit of a numerical range, it is meant that a combination of any one of numerical value mentioned for the lower limit with any one of numerical value mentioned for the upper limit is also disclosed.

In the present disclosure, the terms "comprise", "include", and "have" and conjugated forms thereof are open-ended terms. In a case where an open-ended term is used, an optional component may be further included in addition to the essential component, or may not be included. The term "consist of" is a closed-ended term; however, even a configuration expressed with a closed-ended term may include an impurity that is ordinarily associated or an additional component that is not related to the technique of interest.

For a found value in measurement described in the present disclosure, it was confirmed that even when the measurement was carried out multiple times while changing the location of the measurement field of view selected, there was almost no variation in the measurement results as long as the measurement was made on the same sample.

Embodiment 1: Cemented Carbide

One embodiment of the present disclosure (hereinafter also referred to as "embodiment 1") is a cemented carbide consisting of: a hard phase consisting of a plurality of tungsten carbide grains; and a binder phase comprising cobalt, wherein a content of the hard phase in the cemented carbide is 91.5 mass % or more and 97 mass % or less, a content of the cobalt in the cemented carbide is 3 mass % or more and 8.5 mass % or less, the hard phase has an average grain size of 0.15 μm or more and 0.50 μm or less, the binder phase has an average grain size of 0.10 μm or more and 0.25 μm or less, in a histogram showing a grain size distribution of the hard phase, a number N1 is 7 or more and 10 or less, wherein N1 is the number of classes having a frequency of 50% or more of the maximum frequency Fmax, the classes on the horizontal axis of the histogram represent the grain sizes of the hard phase, and the classes are 0.05 μm intervals, the frequencies on the vertical axis of the histogram represent percentages, on number basis, of the hard phases falling within the respective classes, the percentages based on all of the hard phases, and the binder phase has a ratio of a 10% cumulative grain size D10 on area basis to a 90% cumulative grain size D90 on area basis, D10/D90, of 0.23 or more.

<Composition of Cemented Carbide>

<<Contents of Hard Phase and Binder Phase>>

The cemented carbide of embodiment 1 consists of: a hard phase consisting of a plurality of tungsten carbide grains; and a binder phase comprising cobalt. That is, the total content of the hard phase and the binder phase in the cemented carbide is 100 mass %. The cemented carbide may include inevitable impurities in addition to the hard phase and the binder phase as long as the effect of the present disclosure is not impaired. That is, the cemented carbide may consist of the hard phase, the binder phase, and inevitable impurities. Examples of the inevitable impurities include iron, molybdenum, and sulfur. The content of the inevitable impurities in the cemented carbide (the total content, in a case where two or more kinds of inevitable impurities are included) may be 0 mass % or more and less than 0.1 mass %. The content of the inevitable impurities in the cemented carbide is measured by ICP (Inductively Coupled Plasma) emission spectrometry (analyzer: "ICPS-8100" (trademark), Shimadzu Corporation).

In the cemented carbide of embodiment 1, the content of the hard phase is 91.5 mass % or more and 97 mass % or less, and may be 92 mass % or more and 96 mass % or less, or 94 mass % or more and 95 mass % or less.

The content of the hard phase in the cemented carbide is determined by analyzing a cross section of the cemented carbide using an energy dispersive X-ray spectrometer attached to a scanning electron microscope (SEM-EDX). The measurement is carried out in six different measurement fields of view not overlapping with each other. In the present disclosure, the average of the contents of the hard phase in the six measurement fields of view corresponds to the content of the hard phase in the cemented carbide. The content of the cobalt in the cemented carbide, which will be described later, is determined in the same method as above.

In the cemented carbide of embodiment 1, the content of the binder phase may be 3 mass % or more and 8.5 mass % or less, 4 mass % or more and 8 mass % or less, or 5 mass % or more and 6 mass % or less.

The content of the binder phase in the cemented carbide is the value obtained by subtracting the content of the hard phase from the entire cemented carbide (100 mass %).

<<Content of Cobalt>>

In the cemented carbide of embodiment 1, the content of the cobalt is 3 mass % or more and 8.5 mass % or less, and may be 4 mass % or more and 8 mass % or less, or 5 mass % or more and 6 mass % or less.

<<Content of Chromium>>

In the cemented carbide of embodiment 1, the content of the chromium may be 0.3 mass % or more and 1.0 mass % or less, and may be 0.4 mass % or more and 0.9 mass % or less, or 0.5 mass % or more and 0.8 mass % or less. The content of the chromium in the cemented carbide is measured by ICP emission spectrometry.

<<Content of Vanadium>>

In the cemented carbide of embodiment 1, the content of the vanadium is 0.3 mass % or less, and may be 0 mass % or more and 0.15 mass % or less, or more than 0 mass % and 0.1 mass % or less. The content of the vanadium in the cemented carbide is measured by ICP emission spectrometry.

<Hard Phase>

<<Composition of Hard Phase>>

In the cemented carbide of embodiment 1, the hard phase consists of a plurality of tungsten carbide grains. The tungsten carbide grains here include not only "pure WC grains (encompassing WC that does not include impurity element at all, as well as WC having an impurity element content that is below the limit of detection)" but also "WC grains that intentionally or inevitably contain an impurity element inside at a level such that the effect of the present disclosure is not impaired". The content of the impurity element in the hard phase (the total content, in a case where two or more kinds of element compose the impurity) is less than 0.1 mass %. The content of the impurity element in the hard phase is measured by ICP emission spectrometry.

<<Average Grain Size of Hard Phase>>

In the cemented carbide of embodiment 1, the average grain size of the hard phase is 0.15 μm or more and 0.50 μm or less, and may be 0.20 μm or more and 0.45 μm or less, or 0.25 μm or more and 0.40 μm or less.

In the present disclosure, the average grain size of the hard phase is determined in the following procedure.

Procedure A1. An arbitrary surface or arbitrary cross section of the cemented carbide is mirror-polished. Examples of the method for mirror-polishing include a method involving polishing with diamond paste, a method involving use of a focused ion beam device (FIB device), a method involving use of a cross-section polisher device (CP device), and a combination thereof.

Procedure B1. The polished surface of the cemented carbide is photographed using a scanning electron microscope ("S-3400N", manufactured by Hitachi High-Tech Corporation). Three photograph images are provided. The photographed regions in the three images are different from each other. The locations of the regions to be photographed can be arbitrarily selected. The conditions are as follows: observation magnification 10,000×, acceleration voltage 10 kV, and backscattered electron image.

Procedure C1. The three backscattered electron images obtained in Procedure B1 are captured into a computer by image analysis software (ImageJ, version 1.51j8: https://imagej.nih.gov/ij/), followed by binarization. By clicking the mark "Make Binary" on the computer display after capturing the images, the binarization is executed under the conditions preset in the image analysis software. Furthermore, in order to remove noise, "Despeckle" is executed once, and then "Watershed" is executed, whereby grain boundaries of crystal grains are also determined under the conditions preset in the image analysis software. "Analyze Particle" is executed to make measurement on grains of 0.002 μm² or more. Although it is possible to manually set the threshold value in the binarization, manual setting is not employed in this procedure. In this procedure, the binarization is executed by clicking the mark "Make Binary", as described above.

In a binarized image, the hard phase and the binder phase can be distinguished from each other by shade of color. For example, the hard phase is shown as a black region, and the binder phase is shown as a white region, in a binarized image.

Procedure D1. In each of the three binarized images, a rectangular measurement field of view having a length of 960 pixels and a width of 1280 pixels is set. Using the above image analysis software, the circle equivalent diameter (Heywood diameter: diameter equivalent to that of an equal area circle) is determined for each of all hard phases (black regions) in the three measurement fields of view.

Procedure E1. The 50% cumulative grain size (circle equivalent diameter) D50 on area basis is calculated on the basis of all hard phases in the three measurement fields of view. The D50 corresponds to the average grain size of the hard phase.

<<Grain Size Distribution of Hard Phase>>

In a histogram showing a grain size distribution of the hard phase of the cemented carbide of embodiment 1, the number N1 is 7 or more and 10 or less, wherein N1 is the number of classes having a frequency of 50% or more of the maximum frequency Fmax, and N1 may be 8 or more and 10 or less, or 9 or more and 10 or less. If N1 is 6 or less, the uniformity of the distribution of contacts between the hard phases is poor. If N1 is 11 or more, a large number of coarse hard phases are present, which leads to poor fracture resistance.

The histogram showing the grain size distribution of the hard phase of the cemented carbide is prepared in the following procedure. The grain size (circle equivalent diameter) is determined for each of all hard phases (black regions) in the three measurement fields of view, according to the same method as in measurement procedure A1 to measurement procedure D1 for the average grain size of the hard phase as described above. A histogram in which the horizontal axis and the vertical axis are for the classes and the frequencies, respectively, is prepared on the basis of all of the grain sizes of the hard phase found in the three measurement fields of view. The classes on the horizontal axis of the histogram represent the grain sizes of the hard phase, and the classes are 0.05 µm intervals. The frequencies on the vertical axis of the histogram represent percentages, on number basis, of the hard phases falling within the respective classes, the percentages based on all of the hard phases.

<<Number of Hard Phase Grains Having Grain Size of 5 µm or More, Per Unit Area>>

The number of the hard phases having grain size of 5 µm or more, per unit area, may be 1 per mm$^2$ or less in a cross section of the cemented carbide of embodiment 1. The grain size of the hard phase is measured on an optical microscope image of a cross section of the cemented carbide after etching the cross section of the cemented carbide with a Murakami's reagent. The grain size here is the major axis of each hard phase as measured on the optical microscope image. A region having an area of 1 mm$^2$ is observed under an observation magnification of 1000×, and the number of hard phases having a grain size of 5 µm or more is counted. It is desirable that the measurement field of view should be continuous.

<Binder Phase>
<<Composition of Binder Phase>>

The binder phase of the cemented carbide of embodiment 1 comprises cobalt. The content of the cobalt in the binder phase may be 85 mass % or more and 99.9 mass % or less, or 87 mass % or more and 99 mass % or less, or 90 mass % or more and 98 mass % or less. The content of the cobalt in the binder phase is measured by ICP emission spectrometry.

The binder phase of the cemented carbide of embodiment 1 may contain iron (Fe), nickel (Ni), and dissolved matters (chromium (Cr), tungsten (W), vanadium (V), etc.) in the alloy, in addition to cobalt. The binder phase may consist of cobalt, at least one selected from the group consisting of iron, nickel, chromium, tungsten and vanadium, and an inevitable impurity. Examples of the inevitable impurity include manganese (Mn), magnesium (Mg), calcium (Ca), molybdenum (Mo), sulfur (S), titanium (Ti), and aluminum (Al). It can be determined, by carrying out elemental mapping using an energy dispersive X-ray spectrometer (EDS) on a cross section of the cemented carbide, whether the binder phase contains iron (Fe), nickel (Ni), dissolved matters (chromium (Cr), tungsten (W), vanadium (V), etc.) in the alloy, or an inevitable impurity.

<<Average Grain Size of Binder Phase>>

The average grain size of the binder phase of the cemented carbide of embodiment 1 is 0.10 µm or more and 0.25 µm or less, and may be 0.12 µm or more and 0.24 µm or less, or 0.15 µm or more and 0.22 µm or less.

In the present disclosure, the average grain size of the binder phase is determined in the following procedure. Three binarized images are obtained according to the same method as in procedure A1 to procedure C1 for the measurement of the average grain size of the hard phase described above, except that in procedure B1, the observation magnification is changed to 3000×, and that "Watershed" is not carried out. In each of the images, the same measurement field of view is set as in procedure D1. The grain size (circle equivalent diameter) is determined for each of all binder phases (white regions) in the three measurement fields of view, using the above-described image analysis software. The 50% cumulative grain size (circle equivalent diameter) D50 on area basis is calculated on the basis of all binder phases in the three measurement fields of view. The D50 corresponds to the average grain size of the binder phase.

<<D10/D90 of Binder Phase>>

In the cemented carbide of embodiment 1, the binder phase has a ratio of the 10% cumulative grain size D10 on area basis to the 90% cumulative grain size D90 on area basis, D10/D90, of 0.23 or more, and the D10/D90 may be 0.23 or more and 0.5 or less, or may be 0.25 or more, or 0.25 or more and 0.4 or less.

In the present disclosure, the average grain size of the binder phase is measured in the following procedure. The grain size (circle equivalent diameter) is determined for each of all binder phases (white regions) in the three measurement fields of view, in the same method as the method for determining the average grain size of the binder phase as described above. The 10% cumulative grain size (circle equivalent diameter) D10 and the 90% cumulative grain size (circle equivalent diameter) D90 are calculated on the basis of all binder phases in the three measurement fields of view. Then the D10 is divided by the D90 to thereby obtain the D10/D90.

<Method for Producing Cemented Carbide>

The cemented carbide of embodiment 1 can be produced by performing the step of providing feedstock powders, the mixing step, the granulation step, the molding step, the sintering step, and the cooling step, in this order. Each step will be described below.

<<Providing Step>>

The providing step is the step of providing all feedstock powders for materials constituting the cemented carbide. The examples of feedstock powders include a tungsten carbide powder as the feedstock for the hard phase and a cobalt (Co) powder as the feedstock for binder phase. Furthermore, a chromium carbide ($Cr_3C_2$) powder and a vanadium carbide (VC) powder may be provided as a grain growth inhibitor. Commercially available products may be used as the tungsten carbide powder, the cobalt powder, the chromium carbide powder, and the vanadium carbide powder.

As the tungsten carbide powder, provided are the first WC powder having an average particle size of 0.1 μm or more and 0.3 μm or less and the second WC powder having an average particle size of 0.4 μm or more and 0.8 μm or less.

The first WC powder and the second WC powder each have a ratio of the 20% cumulative particle size d20 on volume basis to the 80% cumulative particle size d80 on volume basis, d20/d80, of 0.2 or more and 1 or less. Such a WC powder has a uniform particle size and has a small content of fine WC particles having a particle size of 0.02 μm or less. In a case where a cemented carbide is prepared by using such a first WC powder and a second WC powder, generation of coarse WC particles due to dissolution and reprecipitation is suppressed in the sintering step.

The average particle size of the cobalt powder is 0.3 μm or more and 1.0 μm or less. Use of fine Co can increase the density of the granulated powder in the subsequent granulating step, and further results in a fine grain size of the binder phase in the cemented carbide after sintering.

The average particle size of the chromium carbide powder may be 0.7 μm or more and 3.5 μm or less. The average particle size of the vanadium carbide powder may be 0.1 μm or more and 1.2 μm or less.

In the present disclosure, the average particle size of a feedstock powder is measured by the FSSS (Fisher Sub-Sieve Sizer) method. As the measurement instrument, "Sub-Sieve Sizer model 95" (trademark), manufactured by Fisher Scientific Inc., is used. The particle size of each WC particles included in the WC powder is measured using a particle size distribution analyzer manufactured by Microtrac Corp.

<<Mixing Step>>

The mixing step is the step of mixing the feedstock powders provided in the providing step. A mixed powder including the feedstock powders mixed with each other is obtained from the mixing step.

The total proportion of the first WC powder and the second WC powder in the mixed powder may be 90 mass % or more and 98 mass % or less. The mass ratio between the first WC powder and the second WC powder in the mixed powder is first WC powder: second WC powder=1:4 to 1:1.

The proportion of the cobalt powder in the mixed powder may be more than 2 mass % and 8.5 mass % or less.

The proportion of the chromium carbide powder in the mixed powder may be 0.3 mass % or more and 1.5 mass % or less. The proportion of the vanadium carbide powder in the mixed powder may be 0 mass % or more and 0.3 mass % or less.

The mixing is carried out using a ball mill. The mixing time is 15 hours or more and 36 hours or less. These conditions can suppress crushing of the feedstock powders, and achieve sufficient mixing of the powders while maintaining the uniformity of the particle sizes of the feedstock powders.

<<Granulation Step>>

In the granulation step, a binder is added to the mixed powder, and the resulting mixture is granulated by an agitating granulation method to obtain a granulated powder. By using the agitating granulation method, an external force is applied to the mixed powder, so that the WC powder and Co powder are compressed. In the granulation step, a spray drying method is generally used in view of productivity. A granulated powder obtained by the agitating granulation method has fewer gaps and thus has a larger density than a granulated powder obtained by the spray drying method. Such a granulated powder is easy to fill into a die or mold in the molding step, which will be described later. Furthermore, such a granulated powder results in favorable adhesion of grains of the hard phase to each other in the cemented carbide after the sintering step, so that a texture of alloy in which the binder phase is finely dispersed can be obtained.

In the agitating granulation method, a binder solution may be added in an amount of 5 wt % based on the mixed powder, and the rotational speed of a granulation blade and the treatment time may be 200 rpm and 30 minutes, respectively. These result in a granulated powder having sufficient uniformity and a grain size easy to handle in molding. After taking out, the granulated powder is dried sufficiently.

<<Molding Step>>

The molding step is the step of molding the granulated powder obtained in the granulation step into an intended shape to obtain a molded body. The molding method and the molding conditions in the molding step are not particularly limited and a general method and conditions may be employed. The intended shape may be, for example, a shape of a cutting tool (e.g., a shape of a small-diameter drill).

<<Sintering Step>>

The sintering step is the step of sintering the molded body obtained in the molding step to obtain a cemented carbide. The sintering temperature may be 1350 to 1400° C. and the sintering time may be 30 to 90 minutes. These can result in a broad grain size distribution, in terms of circle equivalent diameter, of the WC grains in the cemented carbide. In addition, these also suppress generation of coarse WC grains, and can result in a reduced content of fine tungsten carbide grains in the cemented carbide to be obtained.

<<Cooling Step>>

The cooling step is the step of cooling the cemented carbide after completion of the sintering. The cooling rate may be a conventionally known cooling rate.

<<Characteristics of Production Method>>

A possible approach to improve in chipping resistance of a cemented carbide is to make the binder phase small. A method for making the binder phase small may include finely pulverizing the WC powder as the feedstock. However, as the WC powder is finer, the WC powder is more susceptible to agglomeration so that smooth movement of WC grains is inhibited in the sintering step; and a coarse binder phase is thus formed partly in the cemented carbide, which causes poor chipping resistance and poor fracture resistance.

As a result of earnest studies of the present inventors, agglomeration of WC grains due to fine pulverization of a WC powder was suppressed by using the relatively fine first WC powder and the relatively coarse second WC powder in a predetermined ratio. Furthermore, the relatively fine first WC grains were allowed to enter gaps formed by a plurality of the relatively coarse grains of the second WC powder, which led to a fine binder phase and also improved the dispersion of the binder phase.

However, it was impossible to suppress agglomeration of the WC grains sufficiently, only by designing the particle size of the WC powders as described above. Then, the agitating granulation method was further employed in the granulation step to thereby facilitate the reciprocal entering of the WC grains. As a result, a fine binder phase can be present in a uniformly dispersed state in the texture of the cemented carbide, and the cemented carbide can thus have a favorable chipping resistance.

Embodiment 2: Cutting Tool

The cutting tool of embodiment 2 includes a cutting edge made of the cemented carbide of embodiment 1. In the present disclosure, the cutting edge means a part involved in cutting. More specifically, the cutting edge means the region surrounded by the ridgeline of the cutting edge and an imaginary plane 0.5 nm or 2 mm away from the ridgeline toward the cemented carbide side.

Examples of the cutting tool include a cutting bite, a drill, an end mill, an indexable cutting insert for milling, an indexable cutting insert for turning, a metal saw, a gear-cutting tool, a reamer, and a tap. In particular, the cutting tool 10 of embodiment 2 can exhibit an excellent effect when it is a small-diameter drill for processing printed circuit boards as shown in FIG. 1. The cutting edge 11 of the cutting tool 10 shown in FIG. 1 is made of the cemented carbide of embodiment 1.

The cemented carbide of embodiment 1 may form the entire cutting tool of embodiment 2, or may form a part thereof. "Forming a part" here indicates, for example, a mode in which the cemented carbide of embodiment 1 is brazed to an arbitrary base material at a predetermined position thereon to form a cutting edge.

The cutting tool of embodiment 2 may further include a hard film covering at least a part of the surface of the base material made of the cemented carbide. For example, diamond-like carbon or diamond can be used for the hard film.

The cutting tool of embodiment 2 can be obtained by shaping the cemented carbide of embodiment 1 into an intended shape.

EXAMPLES

The present embodiments will be further described specifically by way of examples. However, the present embodiments are not limited by these examples.

[Preparation of Cemented Carbide]
<Providing Step>

As feedstock powders, the first WC powder, the second WC powder, a Co powder, a $Cr_3C_2$ powder, and a VC powder were provided. The average particle sizes of the first WC powder, the second WC powder, and the Co powder used for each sample were as described in Table 1. All of the first WC powders and the second WC powders had a d20/d80 of 0.2 or more and 1 or less. The average particle size of the $Cr_3C_2$ powder was 1.5 μm. The average particle size of the VC powder was 0.8 m.

<Mixing Step>

The feedstock powders were mixed with each other in the amounts loaded shown in Table 1 to prepare a mixed powder. "Mass %" in Table 1 indicates the proportion of the mass of the feedstock powder in the total mass of the mixed powder. The mixing was carried out for 20 hours using a ball mill.

<Granulation Step>

The mixed powder was granulated by the method shown in "Granulation method" in Table 2 to obtain a granulated powder. "Agitating" in Table 2 indicates an agitating granulation method. In the agitating granulation method, a binder solution was added in an amount of 5 wt % based on the mixed powder, and the rotational speed of the granulation blade and the treatment time were 200 rpm and 30 minutes, respectively. "Spray drying" in Table 2 indicates a conventionally known spray drying method.

<Molding Step>

The resulting granulated powder was subjected to press-molding to prepare a molded body in a cylindrical rod shape of φ6 mm.

<Sintering Step>

The molded body was put in a sintering furnace and sintered for 60 minutes at the temperature shown in the column "Sintering temperature" in Table 2 to thereby obtain a cemented carbide.

<Cooling Step>

The cemented carbide after completion of sintering was cooled to thereby obtain a cemented carbide as a sample.

TABLE 1

| | Feedstock powders | | | | | | | |
|---|---|---|---|---|---|---|---|---|
| | First WC powder | | Second WC powder | | Co powder | | $Cr_3C_2$ powder | VC powder |
| Sample No. | Average particle size μm | Amount loaded mass % | Average particle size um | Amount loaded mass % | Average particle size um | Amount loaded mass % | Amount loaded mass % | Amount loaded mass % |
| 1 | 0.1 | 31.0 | 0.4 | 62.1 | 0.7 | 6.0 | 0.7 | 0.19 |
| 2 | 0.3 | 31.1 | 0.8 | 62.2 | 0.7 | 6.0 | 0.7 | 0 |
| 3 | 0.2 | 31.0 | 0.5 | 62.0 | 0.7 | 6.0 | 0.7 | 0.37 |
| 4 | 0.2 | 30.9 | 0.5 | 61.7 | 0.7 | 6.0 | 1.2 | 0.19 |
| 5 | 0.2 | 31.2 | 0.5 | 62.5 | 0.7 | 6.0 | 0.3 | 0 |
| 6 | 0.2 | 31.9 | 0.5 | 63.7 | 0.7 | 3.0 | 1.2 | 0.19 |
| 7 | 0.2 | 30.1 | 0.5 | 60.3 | 0.7 | 8.5 | 0.7 | 0.37 |
| 8 | 0.2 | 31.0 | 0.5 | 62.1 | 0.7 | 6.0 | 0.7 | 0.19 |
| 9 | 0.2 | 30.3 | 0.5 | 60.7 | 0.7 | 8.5 | 0.3 | 0.19 |
| 11 | 0.2 | 32.0 | 0.5 | 64.1 | 0.7 | 3.0 | 0.7 | 0.19 |
| 12 | 0.3 | 31.0 | 0.8 | 62.1 | 0.7 | 6.0 | 0.7 | 0.19 |
| 13 | 0.1 | 30.8 | 0.4 | 61.6 | 0.7 | 6.0 | 1.2 | 0.37 |
| 14 | 0.2 | 32.0 | 0.5 | 64.1 | 0.7 | 3.0 | 0.7 | 0.19 |
| 15 | 0.2 | 31.2 | 0.5 | 62.4 | 0.7 | 6.0 | 0.3 | 0.12 |

TABLE 1-continued

| | Feedstock powders | | | | | | | |
|---|---|---|---|---|---|---|---|---|
| | First WC powder | | Second WC powder | | Co powder | | Cr₃C₂ powder | VC powder |
| Sample No. | Average particle size μm | Amount loaded mass % | Average particle size μm | Amount loaded mass % | Average particle size μm | Amount loaded mass % | Amount loaded mass % | Amount loaded mass % |
|---|---|---|---|---|---|---|---|---|
| 1-1 | 0.2 | 30.7 | 0.5 | 61.4 | 0.7 | 6.0 | 1.4 | 0.50 |
| 1-2 | 0.3 | 31.3 | 0.8 | 62.5 | 0.7 | 6.0 | 0.2 | 0 |
| 1-3 | 0.3 | 92.4 | — | 0.0 | 0.7 | 6.0 | 1.2 | 0.37 |
| 1-4 | 0.2 | 31.0 | 0.5 | 62.1 | 0.7 | 6.0 | 0.7 | 0.19 |
| 1-5 | 0.2 | 32.4 | 0.5 | 64.7 | 0.7 | 2.0 | 0.7 | 0.19 |
| 1-6 | 0.2 | 29.5 | 0.5 | 59.0 | 0.7 | 10.0 | 1.2 | 0.37 |
| 1-7 | 0.2 | 31.0 | 0.5 | 62.1 | 1.6 | 6.0 | 0.7 | 0.19 |
| 1-8 | 0.2 | 31.0 | 0.5 | 62.1 | 0.7 | 6.0 | 0.7 | 0.19 |
| 1-9 | 0.3 | 93.1 | — | 0.0 | 0.7 | 6.0 | 0.7 | 0.19 |
| 1-10 | 0.2 | 31.0 | 0.5 | 62.1 | 0.7 | 6.0 | 0.7 | 0.19 |

TABLE 2

| Sample No. | Granulation method | Sintering temperature ° C. |
|---|---|---|
| 1 | Agitating | 1400 |
| 2 | Agitating | 1400 |
| 3 | Agitating | 1400 |
| 4 | Agitating | 1400 |
| 5 | Agitating | 1400 |
| 6 | Agitating | 1400 |
| 7 | Agitating | 1400 |
| 8 | Agitating | 1400 |
| 9 | Agitating | 1400 |
| 11 | Agitating | 1400 |
| 12 | Agitating | 1400 |
| 13 | Agitating | 1400 |
| 14 | Agitating | 1400 |
| 15 | Agitating | 1400 |
| 1-1 | Agitating | 1400 |
| 1-2 | Agitating | 1480 |
| 1-3 | Agitating | 1400 |
| 1-4 | Agitating | 1480 |
| 1-5 | Agitating | 1400 |
| 1-6 | Agitating | 1400 |
| 1-7 | Agitating | 1400 |
| 1-8 | Spray drying | 1400 |
| 1-9 | Agitating | 1400 |
| 1-10 | Agitating | 1480 |

[Evaluation of Cemented Carbide]

For each cemented carbide as a sample, the content of the hard phase, the cobalt content, the chromium content, and the vanadium content were measured by the methods described in embodiment 1. The results are shown in Table 3.

For each cemented carbide as a sample, the average grain size of the hard phase; the number of classes having a frequency of 50% or more of the maximum frequency Fmax, i.e., N1, in the histogram showing the grain size distribution of the hard phase; and the number of hard phases having a grain size of 5 μm or more per unit area were determined by the methods described in embodiment 1. The results are shown in Table 3.

TABLE 3

| | Cemented carbide | | | | Hard phase | | |
|---|---|---|---|---|---|---|---|
| Sample No. | Hard phase content mass % | Co content mass % | Cr content mass % | V content mass % | Average grain size μm | Histogram N1 | Grain size 5 μm or more Number/mm² |
|---|---|---|---|---|---|---|---|
| 1 | 94.0 | 6.0 | 0.6 | 0.15 | 0.15 | 8 | 0 |
| 2 | 94.0 | 6.0 | 0.6 | 0.00 | 0.50 | 8 | 0 |
| 3 | 94.0 | 6.0 | 0.6 | 0.30 | 0.34 | 7 | 0 |
| 4 | 94.0 | 6.0 | 1.0 | 0.15 | 0.32 | 8 | 0 |
| 5 | 94.0 | 6.0 | 0.3 | 0.00 | 0.36 | 8 | 1 |
| 6 | 97.0 | 3.0 | 1.0 | 0.15 | 0.31 | 8 | 0 |
| 7 | 91.5 | 8.5 | 0.6 | 0.30 | 0.35 | 10 | 0 |
| 8 | 94.0 | 6.0 | 0.6 | 0.15 | 0.35 | 9 | 0 |
| 9 | 91.5 | 8.5 | 0.3 | 0.15 | 0.36 | 8 | 1 |
| 11 | 97.0 | 3.0 | 0.6 | 0.15 | 0.35 | 8 | 0 |
| 12 | 94.0 | 6.0 | 0.6 | 0.15 | 0.50 | 9 | 0 |
| 13 | 94.0 | 6.0 | 1.0 | 0.30 | 0.15 | 7 | 0 |
| 14 | 97.0 | 3.0 | 0.6 | 0.15 | 0.35 | 7 | 0 |
| 15 | 94.0 | 6.0 | 0.3 | 0.10 | 0.37 | 7 | 1 |
| 1-1 | 94.0 | 6.0 | 1.2 | 0.40 | 0.13 | 8 | 0 |
| 1-2 | 94.0 | 6.0 | 0.2 | 0.00 | 0.52 | 8 | 1 |
| 1-3 | 94.0 | 6.0 | 1.0 | 0.30 | 0.23 | 6 | 0 |
| 1-4 | 94.0 | 6.0 | 0.6 | 0.15 | 0.34 | 11 | 1 |
| 1-5 | 98.0 | 2.0 | 0.6 | 0.15 | 0.34 | 8 | 1 |

TABLE 3-continued

| | Cemented carbide | | | | Hard phase | | |
| --- | --- | --- | --- | --- | --- | --- | --- |
| Sample No. | Hard phase content mass % | Co content mass % | Cr content mass % | V content mass % | Average grain size μm | Histogram N1 | Grain size 5 μm or more Number/mm² |
| 1-6 | 90.0 | 10.0 | 1.0 | 0.30 | 0.35 | 8 | 1 |
| 1-7 | 94.0 | 6.0 | 0.6 | 0.15 | 0.36 | 8 | 0 |
| 1-8 | 94.0 | 6.0 | 0.6 | 0.15 | 0.34 | 8 | 1 |
| 1-9 | 94.0 | 6.0 | 0.6 | 0.15 | 0.26 | 6 | 0 |
| 1-10 | 94.0 | 6.0 | 0.6 | 0.15 | 0.39 | 8 | 3 |

For each cemented carbide as a sample, the cobalt content of the binder phase, the average grain size of the binder phase, and the D10/D90 of the binder phase were determined by the methods described in embodiment 1. The results are shown in Table 4.

TABLE 4

| | Binder phase | | | Cutting test | |
| --- | --- | --- | --- | --- | --- |
| Sample No. | Co content mass % | Average grain size μm | D10/ D90 | Chipping Number/ 5 drills | Fracture Number/ 5 drills |
| 1 | 88.2 | 0.19 | 0.23 | 1 | 0 |
| 2 | 91.1 | 0.22 | 0.23 | 0 | 0 |
| 3 | 86.8 | 0.20 | 0.23 | 1 | 0 |
| 4 | 85.2 | 0.18 | 0.24 | 0 | 0 |
| 5 | 99.9 | 0.24 | 0.24 | 0 | 0 |
| 6 | 85.3 | 0.12 | 0.23 | 1 | 0 |
| 7 | 90.1 | 0.25 | 0.23 | 0 | 0 |
| 8 | 88.7 | 0.18 | 0.25 | 0 | 0 |
| 9 | 96.5 | 0.22 | 0.25 | 0 | 0 |
| 11 | 87.0 | 0.10 | 0.25 | 0 | 0 |
| 12 | 92.1 | 0.25 | 0.23 | 0 | 0 |
| 13 | 89.5 | 0.12 | 0.23 | 1 | 0 |
| 14 | 88.4 | 0.10 | 0.24 | 1 | 0 |
| 15 | 95.9 | 0.25 | 0.24 | 0 | 0 |
| 1-1 | 85.8 | 0.20 | 0.23 | 3 | 0 |
| 1-2 | 92.3 | 0.30 | 0.23 | 1 | 3 |
| 1-3 | 87.1 | 0.18 | 0.22 | 2 | 1 |
| 1-4 | 92.0 | 0.21 | 0.23 | 0 | 2 |
| 1-5 | 86.0 | 0.08 | 0.24 | 2 | 2 |
| 1-6 | 92.5 | 0.32 | 0.23 | 3 | 0 |
| 1-7 | 93.4 | 0.30 | 0.24 | 2 | 0 |
| 1-8 | 96.6 | 0.24 | 0.22 | 0 | 1 |
| 1-9 | 92.9 | 0.22 | 0.21 | 2 | 0 |
| 1-10 | 97.2 | 0.20 | 0.24 | 0 | 4 |

[Cutting Test]

Each cylindrical rod made of the cemented carbide as a sample was processed to prepare a small-diameter drill (rotatable tool for processing printed circuit boards) having a drill diameter of #0.15 mm. Drilling was carried out using the drill on a commercially available printed circuit board for a vehicle to evaluate chipping resistance and fracture resistance. The condition for the evaluation test of the chipping resistance was a rotational speed of 200 krpm and a feeding speed of 2 m/min. The condition for the evaluation test of the fracture resistance was a rotational speed of 120 krpm and a feeding speed of 2 m/min.

In each evaluation test, five small-diameter drills were used. The drilling was carried out using each small-diameter drill, and the number of small-diameter drills that suffered chipping or fracture before 6000 hits was counted. The results are shown in Table 4. In this cutting test, it is determined that a small-diameter drill has a prolonged tool life if the number of chipped small-diameter drills in the evaluation test of the chipping resistance and the number of fractured drills in the evaluation test of the fracture resistance were one or less, and zero, respectively.

Consideration

The cemented carbides and the small-diameter drills (cutting tools) as Sample 1 to Sample 15 correspond to examples. It was found that these small-diameter drills each have a prolonged tool life in fine processing of printed circuit boards.

The cemented carbides and the small-diameter drills (cutting tools) as Sample 1-1 to Sample 1-10 correspond to comparative examples. It was found that these small-diameter drills each have an insufficient tool life in fine processing of printed circuit boards.

Embodiments and examples of the present disclosure have been described hereinabove, and it is originally contemplated to appropriately combine any features of the embodiments and the examples described above, or to variously modify them.

It should be appreciated that the embodiments and the examples disclosed hereinabove are illustrative in all respects, and are not limitative. The scope of the present invention is indicated by the claims and not by the above-described embodiments and examples, and it is intended that meanings equivalent to the claims and all modification within the scope of the claims are encompassed by the scope of the present invention.

REFERENCE SIGNS LIST

10 Cutting tool; 11 Cutting edge

The invention claimed is:

1. A cemented carbide consisting of a hard phase consisting of a plurality of tungsten carbide grains; and a binder phase comprising cobalt, wherein
a content of the hard phase in the cemented carbide is 91.5 mass % or more and 97 mass % or less,
a content of the cobalt in the cemented carbide is 3 mass % or more and 8.5 mass % or less,
the hard phase has an average grain size of 0.15 μm or more and 0.50 μm or less,
the binder phase has an average grain size of 0.10 μm or more and 0.25 μm or less,
in a histogram showing a grain size distribution of the hard phase, a number N1 is 7 or more and 10 or less, wherein N1 is the number of classes having a frequency of 50% or more of the maximum frequency Fmax,
the classes on the horizontal axis of the histogram represent the grain sizes of the hard phase, and the classes are 0.05 μm intervals,
the frequencies on the vertical axis of the histogram represent percentages, on number basis, of the hard phases falling within the respective classes, the percentages based on all of the hard phases, and the binder phase has a ratio of a 10% cumulative grain size D10 on area basis to a 90% cumulative grain size D90 on area basis, D10/D90, of 0.23 or more.

2. The cemented carbide according to claim 1, wherein the D10/D90 is 0.25 or more.

3. The cemented carbide according to claim 1, wherein the number of the classes, N1, is 8 or more and 10 or less.

4. The cemented carbide according to claim 1, wherein the cemented carbide contains 0.3 mass % or more and 1.0 mass % or less of chromium.

5. The cemented carbide according to claim 1, wherein the cemented carbide contains 0.3 mass % or less of vanadium.

6. The cemented carbide according to claim 1, wherein a content of the cobalt in the binder phase is 85 mass % or more and 99.9 mass % or less.

7. The cemented carbide according to claim 1, wherein in a cross section of the cemented carbide, the number of hard phases having a grain size of 5 μm or more per unit area is 1 per mm$^2$ or less.

8. A cutting tool comprising the cemented carbide according to claim 1.

\* \* \* \* \*